May 4, 1965 T. S. MILONAS ET AL 3,181,729
FLUID METER DEVICE
Filed Oct. 31, 1962 4 Sheets-Sheet 1
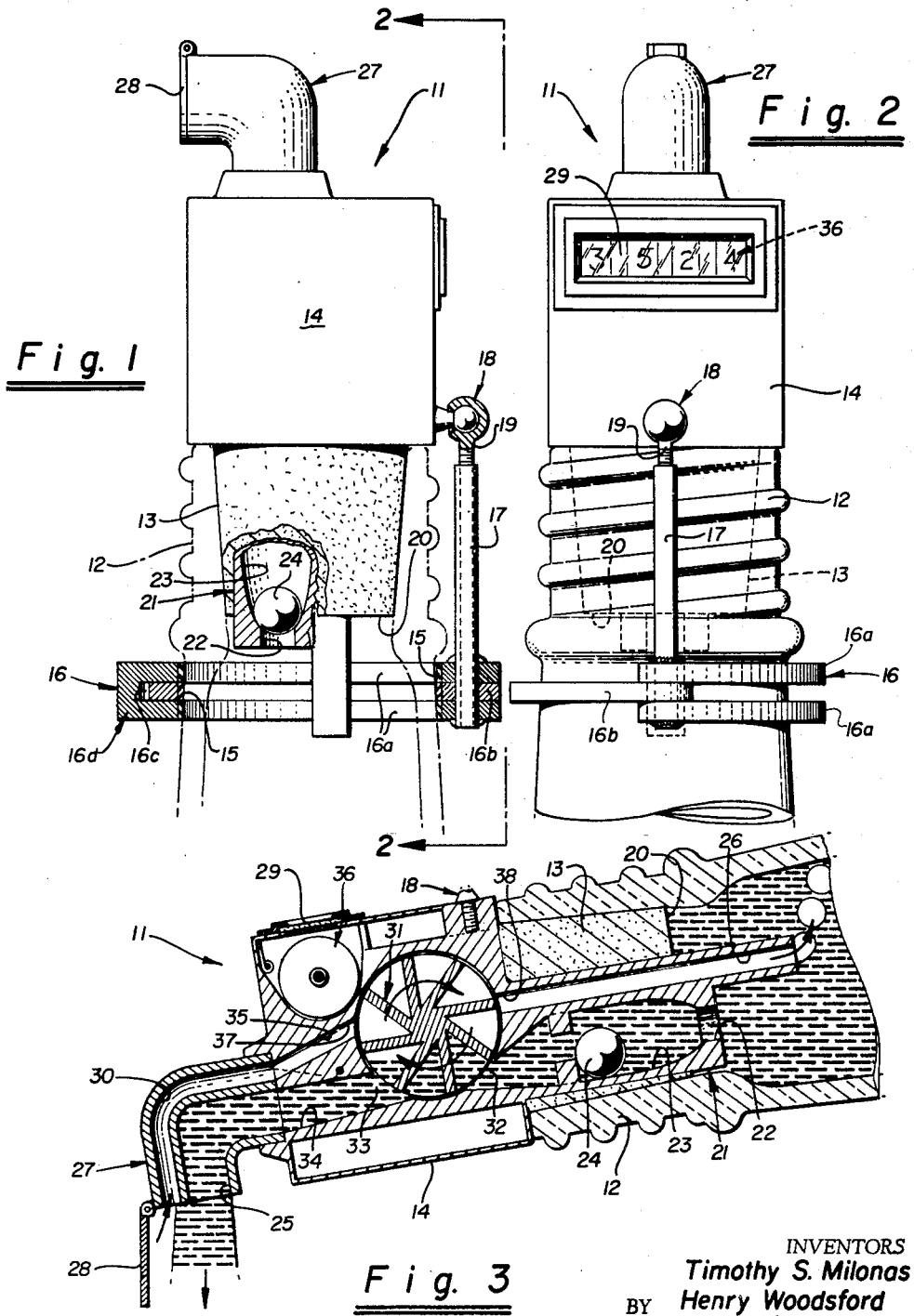
INVENTORS
Timothy S. Milonas
Henry Woodsford
BY
Fryer + Tjensvold
Attorneys

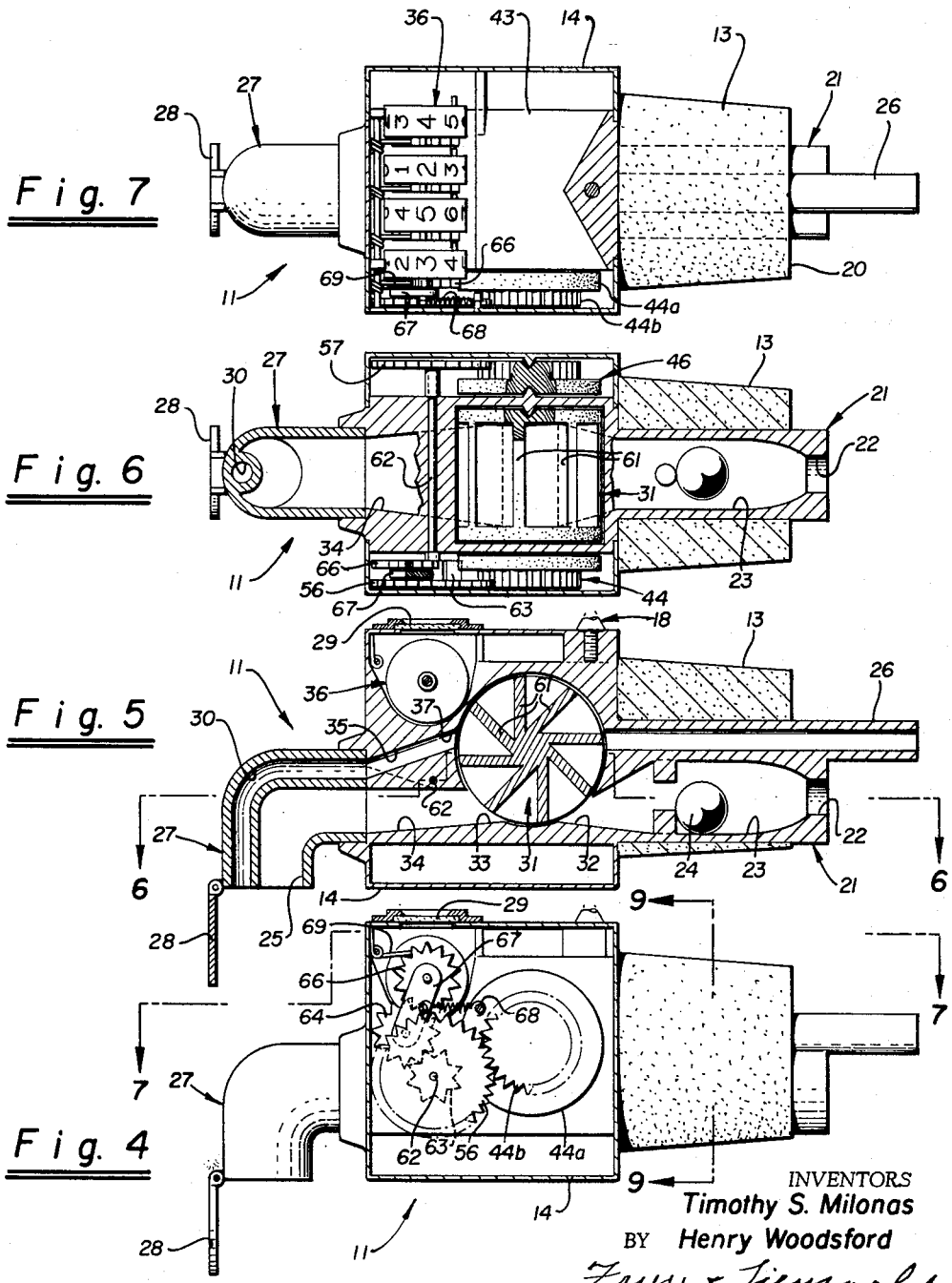

May 4, 1965 T. S. MILONAS ET AL 3,181,729
FLUID METER DEVICE

Filed Oct. 31, 1962 4 Sheets-Sheet 3

INVENTORS
Timothy S. Milonas
BY Henry Woodsford
Fryer + Tjensvold
Attorneys

May 4, 1965 T. S. MILONAS ET AL 3,181,729
FLUID METER DEVICE
Filed Oct. 31, 1962 4 Sheets-Sheet 4

INVENTORS
Timothy S. Milonas
BY Henry Woodsford
Attorneys

United States Patent Office 3,181,729
Patented May 4, 1965

3,181,729
FLUID METER DEVICE
Timothy S. Milonas and Henry Woodsford, San Francisco, Calif.; said Woodsford assignor to said Milonas
Filed Oct. 31, 1962, Ser. No. 234,429
3 Claims. (Cl. 222—36)

The present invention relates to fluid meter devices and more particularly to fluid meter devices for use in conjunction with fluid containers, such as bottles, for the purpose of keeping an accounting of the quantity of fluid which is dispensed from the container.

It is often highly desirable to be able to keep an accurate account of the quantity of fluid dispensed from a container. One method of keeping an account of the fluid in a container is to mark the level of the fluid therein from time to time and record the difference. While this method is satisfactory in certain circumstances, it does not give a direct account in any particular unit of fluid measure and becomes very impractical where there are a great number of containers of which an accurate account must be kept. The level marking method is also unsatisfactory where it is necessary to insure that the level of fluid in a container at a given time has not been altered by the addition of fluid thereto.

The present invention finds particular utility in connection with establishments where alcoholic beverages are sold in a ready to drink state. Such establishments require that a large number of separate bottles containing alcoholic beverages of various kinds be open at the same time. One of the only measures which a proprietor of such a place of business has to determine the amount of stock he must order, or the receipts he should expect, is the quantity of fluid which has been dispensed from the various open bottles. The present invention provides a means by which each open bottle will always display the quantity of its contents which have been dispensed. Thus, a running inventory can be easily kept.

The present invention also includes means by which a proprietor of such an establishment can be assured that no additions to the contents of the bottle are made after it is open. This assures the customer of receiving the quality of beverage which he desires, and also enables the proprietor to rely on his inventory count as an accurate measure of the number of drinks sold.

While the present invention is advantageously employed for the particular purpose suggested above, it is in no way limited thereto. The present invention is also useful in connection with exotic or expensive fluids which are used for medical or scientific purposes. There are a number of liquids which are of such a nature as to require Federal or State supervision in their distribution. A device which would insure that a container has not been refilled or tampered with, and at the same time would furnish means for keeping an accurate account of the amount of fluid dispensed from the container is highly useful in connection with these liquids.

In order for a fluid meter to be suitable for the uses described above, it must have certain characteristics which are not to be found in the prior art. The counter which registers the quantity of fluid which has been dispensed from a container must be so arranged within the meter as to be given by the outflowing fluid or an equivalent quantity. The fluid must be kept separated from as much of the mechanism as possible to prevent contamination of the fluid or corrosion of the parts. The number of parts employed should be minimized to reduce the chances of malfunction. And the meter should not interfere with the ability to dispense fluids at a reasonably fast rate. To prevent fluid from being added to the container, it is necessary to provide a unilateral valve which does not interfere with the other operation of the meter.

The present invention teaches a unique drive means which combines with the several other novel features of the invention to provide a fluid meter having the various operating characteristics noted above, as well as those to be described.

Accordingly, it is an object of the present invention to provide a fluid meter device for use in conjunction with fluid containers.

It is another object of the present invention to provide a fluid meter device which can be secured to a fluid container in such a manner that only an authorized person can remove it therefrom; such device providing a means which accurately counts the amount of fluid dispensed from such container while preventing the addition of fluid to the container.

It is another object of the present invention to provide a novel drive means for use in fluid meters and the like.

Further and more specific objects and advantages of the invention are made apparent in the following specification wherein a preferred form of the invention is described by reference to the accompanying drawings.

In the drawings:

FIG. 1 is a side elevation view of the fluid meter device of the present invention shown in conjunction with the top portion of a fluid container, wherein certain portions of the device are broken away to more clearly show its details;

FIG. 2 is an elevation view of the invention looking along the line 2—2 of FIG. 1 and showing the manner in which the counter is displayed;

FIG. 3 is a longitudinal cross-sectional view of the fluid meter of the invention shown in conjunction with a fluid container wherein the container is in a horizontal position and fluid is being dispensed therefrom;

FIG. 4 is a longitudinal side elevation of the fluid meter of the invention wherein a side wall has been removed to expose internal gearing;

FIG. 5 is a longitudinal cross-sectional view similar to FIG. 3 except that the meter is shown separated from a fluid container;

FIG. 6 is a cross-sectional view of the invention taken through the line 6—6 of FIG. 5;

FIG. 7 is a cross-sectional view of the invention taken through the line 7—7 of FIG. 4;

Figure 8:
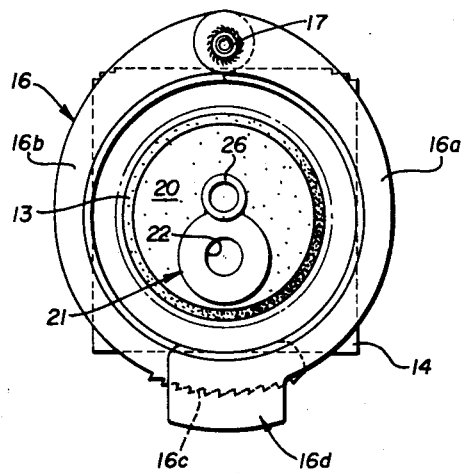
FIG. 8 is an end view of the invention showing the locking means by which the invention is secured to a container.
Figure 9:
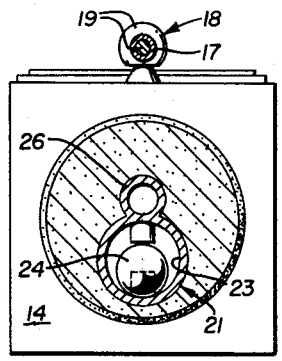
FIG. 9 is a cross-sectional view taken through the line 9—9 of FIG. 4.

Referring now to FIGS. 1 and 2, a fluid meter 11 is secured to the top portion 12 of a container, i.e., a bottle from which the contents are normally dispensed. Meter 11 terminates at one end in a tapered mounting member 13 having a covering of cork or similar resilient material. To mount the meter, member 13 is inserted into the bottle opening. A seal is formed between the interior of the top portion 12 of the bottle and the cork covered member 13 so that any fluid which passes out from the bottle is restricted to a path through the fluid meter 11.

A locking device 16 is attached to housing 14 of meter 11 through a connecting rod 17 and a ball and socket joint 18. The socket portion of joint 18 includes a threaded extension 19 which screws into connecting rod 17 so that the distance between the locking device 16 and the housing 14 can be varied to meet the requirements of bottles of different dimensions.

A fluid path between the interior of the container and pouring spout 27 of meter 11 includes opening 22, inlet chamber 23, and the counting mechanism in housing 11. The opening 22 is formed by a portion of the structure 21 which defines the chamber 23. As shown in the drawing, the opening defining portion of structure 21 may extend below the bottom 20 of member 13 to increase the interior of chamber 23. A ball 24 trapped in chamber 23 forms a check valve with opening 22 such that fluid flow through the opening is restricted to one direction. When the container is positioned to pour (FIG. 3), fluid enters chamber 23, passes through the interior of housing 14, and passes out of the container through nozzle 22 which has a cover 23 hingedly connected at its opening 25. As the fluid passes through housing 14, mechanism therein is driven such that the quantity of fluid which passes out of the container is automatically registered on a counter which is advantageously displayed through a window 29.

Referring now to FIG. 3, as well as FIGS. 1 and 2, mounted within housing 14 and disposed in the fluid path between chamber 23 and spout 27 is a rotor 31. Housing 14 is so formed internally that rotor 31 is completely encased except for a pair of inlet openings and a pair of outlet openings. One inlet and outlet provides a passage through the rotor chamber for fluid, while the other inlet and outlet provide an air passage therethrough.

Both the fluid inlet 32 and fluid outlet 33 are disposed at the lower half of the rotor chamber (as shown in FIG. 3). Inlet 32 communicates with chamber 23 while outlet 33 leads directly into a passage 34 leading to spout 27. Thus, the only communication which the fluid to be dispensed has with the mechanism in housing 14 is through rotor 31. The rotor responds to fluid passing from inlet 32 to outlet 33 by rotating in a clockwise direction (as shown). It is the rotation of rotor 31 which is employed to drive a counter 36 and thereby measure the fluid that leaves the container.

In order for fluid to freely flow out of a container to which meter 11 is attached, it is necessary to provide a path by which air can enter the container and fill the space left by the dispensed fluid. For this purpose, a separate passage 30 is provided in spout 27. Passage 30 communicates with a passage 35 in housing 14, and passage 35 leads to the interior of the rotor chamber through the second chamber inlet 37. Air entering the rotor chamber through opening 37 tends to drive rotor 31 in the same direction as the fluid drives it. Thus, air is carried by the rotor until it reaches the second chamber outlet 38. Outlet 38 leads to an air outlet pipe 26 which extends through member 13 into the interior of the container top 12. By having the air path through the rotor chamber above the fluid chamber (as shown in FIG. 3), the possibility of fluid obstructing the air flow is precluded. While it is advantageous to include the rotor chamber in the air path, it is not a necessary requirement.

One of the outstanding features of the present invention is the manner in which the rotation of rotor 31 is transmitted to counter 36. The unique means employed by the invention to drive counter 36 not only enables the counter to register the quantity of fluid dispensed in any desirable units, but also enables the mechanical components which connect the rotor to the counter to be completely separated from any of the fluid passages.

Figure 10:
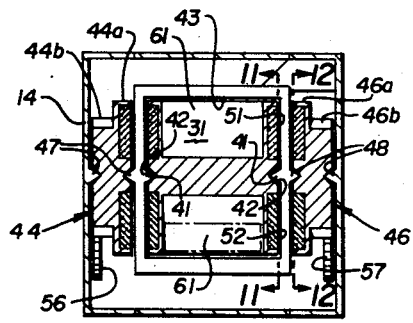
FIG. 10 is a cross-sectional view of the magnetic drive mechanism of the metering device of the invention.
Figures 11, 12:
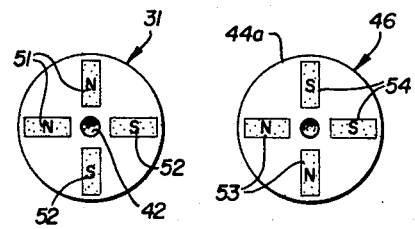
FIG. 11 is an end view of the rotor of FIG. 10 looking along the lines 11—11 of FIG. 10.
FIG. 12 is an end view looking along lines 12—12 of FIG. 10 illustrating the magnetic gear which is rotated by the rotor of FIG. 11.

Referring now to FIGS. 10, 11 and 12, rotor 31 is mounted within the rotor chamber on a pair of bearings 41. Bearings 41 and the indentations 42 in the rotor 31 into which the bearings extend may be made of low friction, long wearing jewels, so that once the rotor chamber is sealed closed it will not have to be subsequently opened within the lifetime of the meter. It is of particular importance to note that bearings 41 are affixed to the interior of the structure 43 which defines the rotor chamber, and there are no shafts or other such members which extend through the structure 43. Thus, fluid which passes through the rotor chamber cannot exit therefrom through any opening other than the outlet 33 (FIG. 3). The absence of mechanical components which extend through the rotor chamber defining structure 43 also eliminates the need to employ elaborate seals or the like, which are prone to need relatively frequency replacement or repair.

The present invention is able to use the rotation of rotor 31 to drive a counter 36 even though there is no direct mechanical connection between the two, through a unique arrangement of several magnetized components.

The rotation of rotor 31 is transmitted to a pair of gears 44 and 46 each disposed in facing relation to the ends of rotor 31 (the invention can be practiced using only gear 44). Gears 44 and 46 are disposed exteriorly of the rotor chamber and mounted on bearings 47 and 48, respectively. Gear 44 has a magnetically responsive portion 44a integrally connected to a conventional toothed gear portion 44b. Similarly, gear 46 has a magnetically responsive portion 46a integrally connected to a conventional toothed gear portion 46b. The magnetic portions 44a and 46a of gears 44 and 46, respectively, are sufficiently coupled to magnetic members at the ends of rotor 31 to be rotated thereby.

FIG. 11 illustrates the pattern established on the ends of the rotor (both ends being similar), by permanent magnets 51 and 52. One advantageous arrangement of the magnets is established by spacing them at 90° intervals and having the two magnets 51 oriented with their north poles facing the external gears and the two magnets 52 with their south poles facing the external gears. It is further advantageous to have magnets 51 adjacent to one another and the same for magnets 52. With this arrangement, rotation of the rotor 31 sets up a changing magnetic field at both ends of the rotor. These changing magnetic fields penetrate the rotor chamber defining structure 43 and induce rotation of gears 44 and 46 by virtue of the magnetic portions of these gears which keep their magnetic patterns aligned with those of the rotor. FIG. 12 illustrates the pattern of magnets on the face of gear 46 (the pattern is the same on gear 44). A pair of adjacent magnets 53 having their north poles facing the rotor 31, and a pair of adjacent magnets 54 having their south poles facing the rotor are all arranged at 90° intervals around the gear. The gears are shown in a static condition (each north pole magnet facing a south pole magnet) as when the rotor is not being driven. When the rotor is driven, the magnetic pattern established by magnets 51 and 52 will be moved out of complementary alignment with the magnetic pattern established by magnets 53 and 54. The gears 44 and 46 will move in an attempt to reestablish a favorable relationship with the rotor 31, and thus be driven by the rotor. Rotation of gears 44 and 46 results in rotation of gears 56 and 57 which mesh with gear portions 44b and 46b, respectively.

There are a number of ways in which magnets 51 and 52 can be physically disposed on the ends of rotor 31. They can simply be imbedded in the rotor end plates 58 and 59 (see FIG. 6) in the same manner that the magnets 53 and 54 are embedded in gears 44 and 46. One manner of creating the desired magnetic pattern at the ends of the rotor which is highly advantageous due to its simplicity, is to select certain of the vanes 61 which comprise rotor 31 and condition them to be permanently magnetized. The magnetic pattern thus created will not be disturbed by end plates 58 and does not require the tedious task of embedding small separate magnets.

The rotor design shown in FIGS. 3 and 5 is one in which the vanes 61 do not lie along a radius of the circle which their extreme edges define—rather the vanes are tangential to a small inner circle. This vane arrangement is most advantageous with regard to the angle at which air from inlet 35 impinges upon the vanes, but does not make it possible to have magnetic vanes at precise 90° intervals around the rotor. The slight deviation from the pattern of FIGS. 11 and 12, however, does not interfere with the effective coupling between the rotor and gears 44 and 46.

Referring now to FIGS. 4–7, gears 56 and 57 are connected by a shaft 62 so that the forces created by the two rotating ends of rotor 81 can be concentrated at one side of the device. This combined effort is employed to rotate a gear 63 which is non-rotatably affixed to the inner side of gear 56 at the center thereof. Gear 63 is materially smaller than either of gears 56 or 57 and thus creates a gear ratio reduction and an accompanying torque increase. An intermediate gear 64 meshes with gear 63 and also a counter drive gear 66. Gear 64 is a floating gear and is kept in firm engagement with gears 63 and 66 by means of a connecting link 67 which is spring biased by spring 68.

The several gears described form a mechanical connection between gears 44 and 46 and counter 36 such that rotation of rotor 31 can be recorded by the counter. By the proper choice of gear ratios, the counter can be made to register the outflow in any desired units of fluid measure. A pawl 69 combines with gear 66 to prevent reverse movement thereof and thus preclude the possibility of the counter being driven so as to reduce its count.

Figure 13:
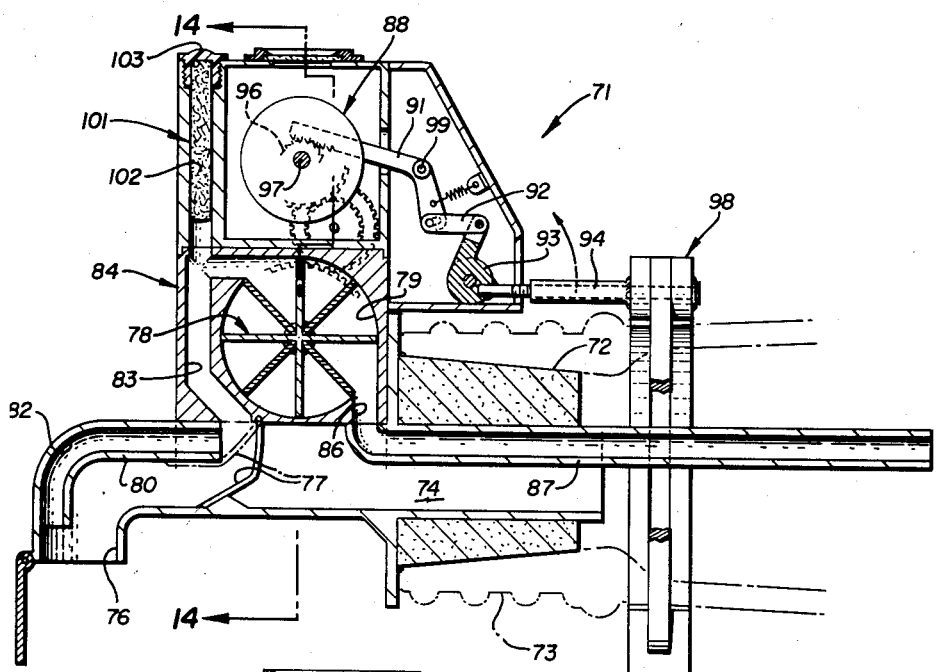
FIG. 13 is a longitudinal cross-sectional view similar to FIG. 3, illustrating an alternate embodiment of the invention.
Figure 14:
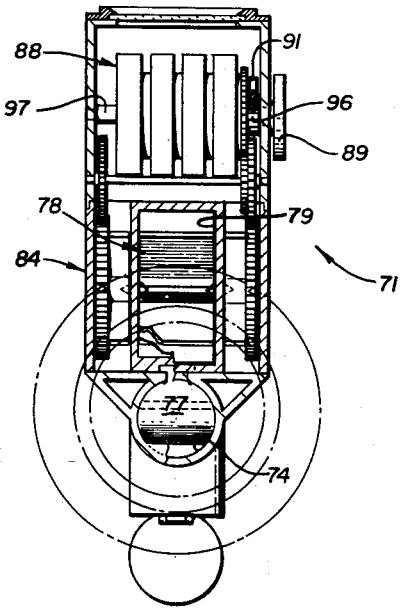
FIG. 14 is a cross-sectional view taken through the line 14—14 of FIG. 13.

Referring now to FIGS. 13 and 14, a fluid meter 71 terminates at one end in a tapered mounting member 72 covered with a resilient material such as cork. Meter 71 is mounted on a container by inserting member 72 into the top portion 73 thereof. A seal is formed between the interior of top portion 73 and member 72 so that the only fluid path from the container is through meter 71. The fluid path through the meter is straight forward and includes simply passage 74 and spout 76. Passage 74 is separated from spout 76 by a hinged flap 77 which swings to an upward position (shown in broken lines) when fluid in passage 74 acts against it. In this manner, fluid can be dispensed from the container without obstruction, but an attempt to pass fluid from spout 76 into passage 74 will cause the flap to close and prevent fluid flow into the container. Flap 77 is thus seen to provide the same function as check valve ball 24 (FIGS. 3, 5 and 6). For the most part, the use of either the swinging flap or the check valve is a matter of choice.

Disposed above (as shown in FIGS. 13 and 14), and completely separated from the fluid flow path, is a rotor 78. Rotor 78 is completely enclosed within a rotor chamber 79 which has only two openings—an intake and an outlet—through which rotor 78 is exposed to outside forces. Rotor 78 differs slightly from rotor 31 (FIGS. 3, 5 and 6) in that the rotor vanes 81 are all radially directed toward a common point. The design of rotor 78 lends itself more favorably to the use of magnetized vanes than does the design of rotor 31, but once again, the use of one or the other is mostly a matter of choice.

The driving force for the rotor 78 is provided by the air which must enter the container to fill the space left by fluid which has been dispensed. The only path by which this air can enter the container includes an air passage 82 in spout 76, formed by a small tube 80, an air intake passage 83 in housing 84, rotor chamber 79, air outlet passage 86 and pipe 87 which extends through member 72 into the container. The quantity of air entering the container will be proportional to the quantity of fluid dispensed therefrom so that the number of rotations of rotor 78 is convertible into a count of the fluid outflow. The rotor 78 is mounted on bearings in the same manner as rotor 31 so that the air passing through the rotor chamber will furnish sufficient force to induce rotation of the rotor 78.

The gearing by which the rotation of rotor 78 is transmitted to a counter 88 is precisely the same as that described with reference to the embodiment of FIG. 3 and thus need not be described again. The embodiment of FIGS. 13 and 14 is especially advantageous where the fluid being dispensed has a syrup-like consistency which would be difficult to direct through a rotor chamber. It is also advantageous where the fluid being dispensed is highly reactive or corrosive and the rotor would be subjected to damage thereby. Once again, however, one of the outstanding features is the ability to prevent loss of the driving media (air in this case) through shaft openings and the like. This being attributable to the magnetic drive system employed.

Counter 88 is provided with an external adjustment knob 89 which enables the counter to be reset. Where the ability to change the counter setting is to be delegated to authorized personnel exclusively, a linkage system comprising securing link 91, connecting link 92, lever 93, and securing rod 94 is employed. Link 91 has a toothed end portion which meshes with a gear 96 on the shaft 97 of counter 88. When link 91 and gear 96 mesh, the counter cannot be reset by knob 89 by virtue of gear 96 holding shaft 97 against rotation. When a person authorized to remove the meter from the container removes locking mechanism 98, rod 94 can be urged away from the meter causing lever 93 to rotate counterclockwise. This movement of lever 93 urges link 92 toward the counter thus causing link 91 to rotate about pivot point 99 so as to disengage the link from gear 96. Once link 91 and gear 96 are disengaged, knob 89 will freely operate the counter. This reset mechanism is, of course, operable with either embodiment of the invention.

Another feature of the invention illustrated with reference to the embodiment of FIG. 13 but not restricted thereto, is contamination indicator 101. Indicator 101 includes a quantity of material 102 visually reactive to suspected contaminating substances. By placing this material in contact with the air path through the meter, any gases which would react undesirably with the remaining contents in the container can be detected by an inspection through window 103.

When the meter of the present invention is used under circumstances where it is necessary to limit access to the container to authorized personnel, some means of locking the meter to the container must be used. While there are a number of locking means known in the art which are suitable for the purposes of the present invention, locking mechanism 16 (mechanism 98 is identical) shown in FIGS. 1, 2 and 8 is exceptionally advantageous. Referring to the aforementioned figures, a connecting rod 17 forms a rigid connection between meter 11 and locking mechanism 16. Rod 17 is secured to the meter through ball and socket joint 18 wherein the distance between the meter and lock can be varied by adjustment of the threaded portion 19 of the socket.

Locking mechanism 16 comprises a pair of spaced apart, parallel, semi-circular members 16a which are rigidly secured to rod 17. Rotatably secured to rod 17 between members 16a is a semi-circular member 16b. At the free end of member 16b there is formed a series of ratchet teeth 16c which mate with a receiving member between the free ends of members 16a, generally indicated at 16d, to form a complete circular member which can only be opened by use of a key. This locking mechanism is suitable for use with containers having top portions of various sizes. By lining the inner surface of the locking members 16a and 16b with a resilient material 15, the lock can be used with glass containers and a tight fit can be obtained without possible damage to the container.

We claim:

1. In a fluid meter for use in connection with a fluid container having a portion through which fluid is dispensed the combination comprising;

a housing having a fluid passage therethrough;
mounting means associated with said housing by which said housing is connected to the container dispensing portion such that fluid dispensed from the container passes through the fluid passage in said housing;
a rotor operatively disposed within said housing, said rotor responsive to fluid leaving the container and flowing through the housing passage by rotating about its axis, the number of revolutions of said rotor being a function of the quantity of fluid passing through said housing, said rotor comprising a plurality of vanes disposed between a pair of generally circular end plates;
a plurality of magnets embedded in one of said end plates wherein some of said magnets are oriented in one polarity and the others in an opposite polarity;
a magnetic gear in spaced facing relation to the end of said rotor, said gear having a magnetic force pattern established thereon whereby said gear is coupled to said rotor to rotate therewith;
a counter; and
counter drive means connected to said magnetic gear whereby rotation of said gear operates said counter.

2. In a fluid meter for use in connection with a fluid container having a portion through which fluid is dispensed the combination comprising;
a housing having a fluid passage therethrough;
mounting means associated with said housing by which said housing is connected to the container dispensing portion such that fluid dispensed from the container passes through the fluid passage in said housing;
a rotor operatively disposed within said housing, said rotor responsive to fluid leaving the container and flowing through the housing passage by rotating about its axis, the number of revolutions of said rotor being a function of the quantity of fluid passing through said housing, said rotor comprising a plurality of vanes which are permanently magnetized and disposed such that some vanes are of opposite polarity with respect to other vanes;
a magnetic gear in spaced facing relation to the end of said rotor, said gear having a magnetic force pattern established thereon whereby said gear is coupled to said rotor to rotate therewith;
a counter; and
counter drive means connected to said magnetic gear whereby rotation of said gear operates said counter.

3. In a fluid meter for use in conjunction with a fluid container having a portion through which fluid is dispensed the combination comprising;
a housing having a fluid passage therethrough;
mounting means associated with said housing by which said housing is connected to the container dispensing portion such that fluid dispensed from the container passes through the fluid passage in said housing;
a rotor operatively disposed within said housing in the fluid passage therethrough such that fluid passing through said housing drives said rotor;
magnetic means affixed to said rotor on either end thereof establishing a magnetic force pattern at either end of said rotor;
magnetic gears in spaced facing relation to each end of said rotor, each of said gears having a magnetic force pattern established thereon whereby said gears are coupled to said rotor to rotate therewith;
means combining the forces transmitted by said gears;
a counter; and
counter drive means connected to said means joining the magnetic gears whereby rotation of said gears operates said counter.

References Cited by the Examiner
UNITED STATES PATENTS

| | | | |
|---|---|---|---|
| 75,313 | 3/68 | Stein | 235—94 |
| 1,746,590 | 2/30 | Hazle | 222—481 X |
| 2,150,082 | 3/39 | Sprunger | 222—335 X |
| 2,444,797 | 7/48 | Williams. | |
| 2,734,659 | 2/56 | Smith | 222—481 X |
| 2,754,034 | 7/56 | Gonzales et al. | 222—36 X |
| 2,768,316 | 10/56 | Neiss. | |

LOUIS J. DEMBO, *Primary Examiner.*
RAPHAEL M. LUPO, *Examiner.*